(12) United States Patent
Lim et al.

(10) Patent No.: US 12,434,049 B2
(45) Date of Patent: Oct. 7, 2025

(54) SYSTEM FOR UNATTENDED DELIVERY OF COGNITIVE NEUROMODULATION THERAPY

(71) Applicants: REGENTS OF THE UNIVERSITY OF MINNESOTA, Minneapolis, MN (US); THE UNITED STATES GOVERNMENT AS REPRESENTED BY THE DEPARTMENT OF VETERANS AFFAIRS, Washington, DC (US)

(72) Inventors: Kelvin O. Lim, Minneapolis, MN (US); Jazmin Camchong, Minneapolis, MN (US)

(73) Assignees: REGENTS OF THE UNIVERSITY OF MINNESOTA, Minneapolis, MN (US); THE UNITED STATES GOVERNMENT AS REPRESENTED BY THE DEPARTMENT OF VETERANS AFFAIRS, Washington, DC (US)

( * ) Notice: Subject to any disclaimer, the term of this patent is extended or adjusted under 35 U.S.C. 154(b) by 658 days.

(21) Appl. No.: 17/618,750

(22) PCT Filed: Jun. 15, 2020

(86) PCT No.: PCT/US2020/037779
§ 371 (c)(1),
(2) Date: Dec. 13, 2021

(87) PCT Pub. No.: WO2020/252470
PCT Pub. Date: Dec. 17, 2020

(65) Prior Publication Data
US 2022/0257936 A1   Aug. 18, 2022

Related U.S. Application Data

(60) Provisional application No. 62/861,599, filed on Jun. 14, 2019.

(51) Int. Cl.
*A61N 1/08* (2006.01)
*A61N 1/02* (2006.01)
(Continued)

(52) U.S. Cl.
CPC ............... *A61N 1/08* (2013.01); *A61N 1/025* (2013.01); *A61N 1/0472* (2013.01); *G06T 7/73* (2017.01);
(Continued)

(58) Field of Classification Search
None
See application file for complete search history.

(56) References Cited

U.S. PATENT DOCUMENTS 10,433,756 B1 * 10/2019 Bachelder ............ A61B 5/6814
2015/0335876 A1 * 11/2015 Jeffery ................. A61N 1/0492
607/139

(Continued)

FOREIGN PATENT DOCUMENTS

WO     2019108968 A1    6/2019

OTHER PUBLICATIONS

Bifulco et al., Telemedicine Supported by Augmented Reality: An Interactive Guide for Untrained People in Performing an ECG Test, BioMedical Engineering OnLine, 2014, 13(153): 1-16.
(Continued)

*Primary Examiner* — Michael W Kahelin
(74) *Attorney, Agent, or Firm* — QUARLES & BRADY LLP

(57) ABSTRACT

The neuromodulation system can include a headpiece comprising. The headpiece can include a first surface, a second surface opposite the first surface, and a plurality of electrodes coupled to the first surface of the headpiece, each of the plurality of electrodes can have a known spatial relationship to each other. The neuromodulation system can include at least one placement marker coupled to the second surface. The at least one placement marker can have a known spatial relationship to each of the plurality of electrodes in order to facilitate correct positioning of the headpiece relative to an anatomical feature of a user. The neuromodulation system can include an electrical signal generator in communication with the plurality of electrodes, and a controller device in communication with the electrical signal generator and configured to operate the electrical
(Continued)

signal generator in order to generate an electrical stimulation using the plurality of electrodes.

7 Claims, 12 Drawing Sheets

(51) Int. Cl.
*A61N 1/04* (2006.01)
*G06T 7/73* (2017.01)

(52) U.S. Cl.
CPC .............. *G06T 2207/30004* (2013.01); *G06T 2207/30196* (2013.01); *G06T 2207/30204* (2013.01)

(56) References Cited

U.S. PATENT DOCUMENTS

| | | | | |
|---|---|---|---|---|
| 2015/0343196 | A1* | 12/2015 | Vasapollo | A61N 1/048 607/45 |
| 2016/0008632 | A1* | 1/2016 | Wetmore | A61N 1/36025 607/45 |
| 2017/0043160 | A1* | 2/2017 | Goodall | A61B 5/318 |
| 2017/0095667 | A1 | 4/2017 | Yakovlev et al. | |
| 2017/0224990 | A1* | 8/2017 | Goldwasser | A61N 1/0476 |
| 2018/0003579 | A1* | 1/2018 | Esposito | A41F 9/00 |
| 2018/0185649 | A1 | 7/2018 | Michaeli et al. | |
| 2019/0336766 | A1* | 11/2019 | Lee | A61B 5/398 |
| 2021/0299434 | A1* | 9/2021 | Månsson | A61N 1/0476 |

OTHER PUBLICATIONS

Neuroelectrics, Starstim® tES-EEG Systems, Retrieved from https://www.neuroelectrics.com/solutions/starstim, Copyright 2023 Neuroelectrics, 6 pages.

Song et al., Augmented Reality-Based Electrode Guidance System for Reliable Electroencephalography, BioMedical Engineering OnLine, 2018, 17(64): 1-10.

Soterix Medical, Snap Accessories for Remote Neuromodulation, Retrieved from https://soterixmedical.com/research/remote/snap-headgear, Copyright 2023 Soterix Medical Inc., 8 pages.

PCT International Search Report and Written Opinion, PCT/US2020/037779, Sep. 11, 2020, 13 pages.

* cited by examiner

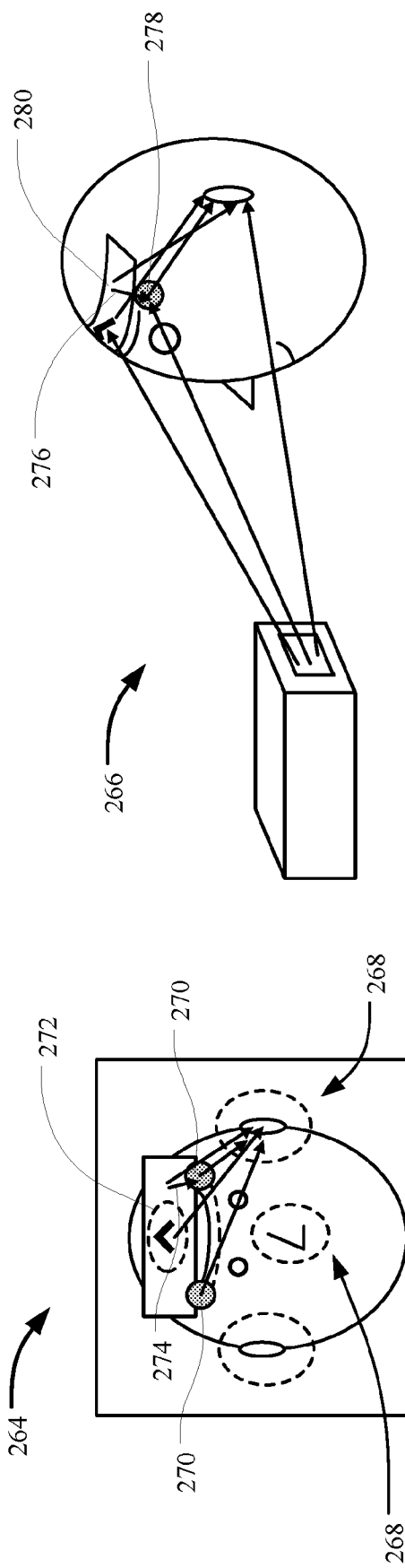
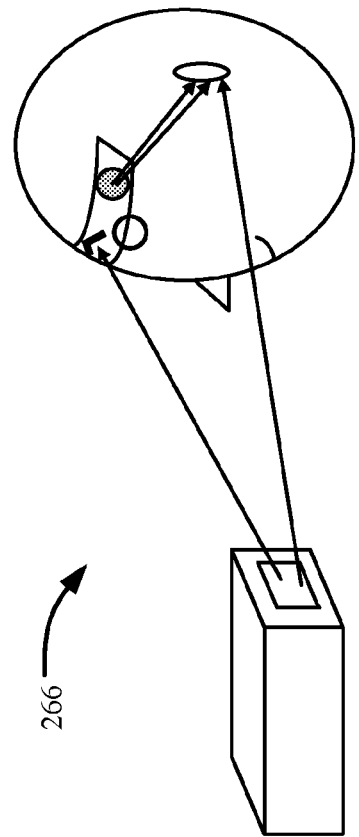
FIG. 8
FIG. 9

SYSTEM FOR UNATTENDED DELIVERY OF COGNITIVE NEUROMODULATION THERAPY

CROSS-REFERENCE TO RELATED APPLICATIONS

This application represents the U.S. National Stage of International Application No. PCT/US2020/037779, filed Jun. 15, 2020 which claims priority to U.S. Patent Application No. 62/861,599 filed Jun. 14, 2019, and entitled, "System for Unattended Delivery of Cognitive Neuromodulation Therapy," which is hereby incorporated by reference in its entirety.

STATEMENT REGARDING FEDERALLY SPONSORED RESEARCH

This invention was made with government support under MH116987 and AA026349, awarded by National Institutes of Health. The government has certain rights in the invention.

BACKGROUND

Addiction, depression, and other psychiatric disorders remain prevalent in the modern world. Current treatments for these conditions often involve pharmaceutical intervention, which may or may not be beneficial for users. Recently, new therapies, some of which provide electrical stimulation to a user's head, have gained traction. Other alternative treatments require a person to repeatedly practice a cognitive training task such as a memory game to treat cognitive impairment, a condition that impedes recovery in disorders such as addiction and depression. Some treatments have even combined therapies together, such as non-invasive neuromodulation along with cognitive training tasks to enhance their effectiveness. However, the delivery of these combined treatments is currently limited because patients are not able to administer these treatments unattended.

For example, existing delivery models involve a complex process that requires supervision of trained personnel at every step of the treatment including: delivering instructions, ensuring proper placement of the electrode hardware, monitoring task performance, monitoring neuromodulation, real-time adjusting, and logging/reporting the treatment. This level of complexity limits the wide clinical adoption of this treatment, due to the required oversight of trained personnel during treatment.

Thus, there remains a need to provide a neuromodulation system that allows a user to successfully complete a neuromodulation treatment session, with minimal professional supervision.

SUMMARY OF THE DISCLOSURE

The present disclosure addresses the aforementioned drawbacks by providing a neuromodulation system. The neuromodulation system includes a headpiece having a first surface, a second surface opposite the first surface, a first electrode coupled to the first surface, and placement marker coupled to the second surface. The placement marker having a known spatial relationship to the first electrode. The neuromodulation system also includes a camera, a user interface, and a controller device in communication with the camera and the user interface. The controller device is configured to operate the camera to acquire an image of a user wearing the headpiece, where the image includes an anatomical feature of the user and at least a portion of the placement marker. The controller device determines a spatial relationship between the anatomical feature and the placement marker, and generates on the user interface an indication of the spatial relationship between the anatomical feature and the placement marker.

It is another aspect of the present disclosure to provide a neuromodulation system. The neuromodulation system includes a headpiece having a first surface, a second surface opposite the first surface, and a plurality of electrodes coupled to the first surface. Each of the plurality of electrodes have a known spatial relationship to each other. The headpiece includes at least one placement marker coupled to the second surface, where the at least one placement marker has a known spatial relationship to each of the plurality of electrodes in order to facilitate correct positioning of the headpiece relative to an anatomical feature of a user. The neuromodulation system further includes an electrical signal generator in communication with the plurality of electrodes, and a controller device in communication with the electrical signal generator. The controller device is configured to operate the electrical signal generator in order to generate an electrical stimulation using the plurality of electrodes.

It is another aspect of the present disclosure to provide a method of placing an electrode on a user. The method includes providing a headpiece including the electrode and a placement marker, the electrode and the marker having a known spatial relationship. The method further includes acquiring an image of the user wearing the headpiece, the image including an anatomical feature of the user and the marker, and calculating a spatial relationship between the anatomical feature and the marker. The method also includes generating on a user interface an indication to the user that the headpiece is correctly positioned relative to an anatomical target when the calculated spatial relationship is within a predetermined threshold.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

BRIEF DESCRIPTION OF THE DRAWINGS

FIG. 8 shows on the left side, an illustration of another image, and on the right side, an illustration of another electrode placing system having distance measuring capabilities, where the electrodes are not in the desired position.

FIG. 9 shows on the left side, an illustration another image, and on the right side, an illustration of the electrode placing system of FIG. 8, where the electrodes are in the desired position.

DETAILED DESCRIPTION

Figure 1:
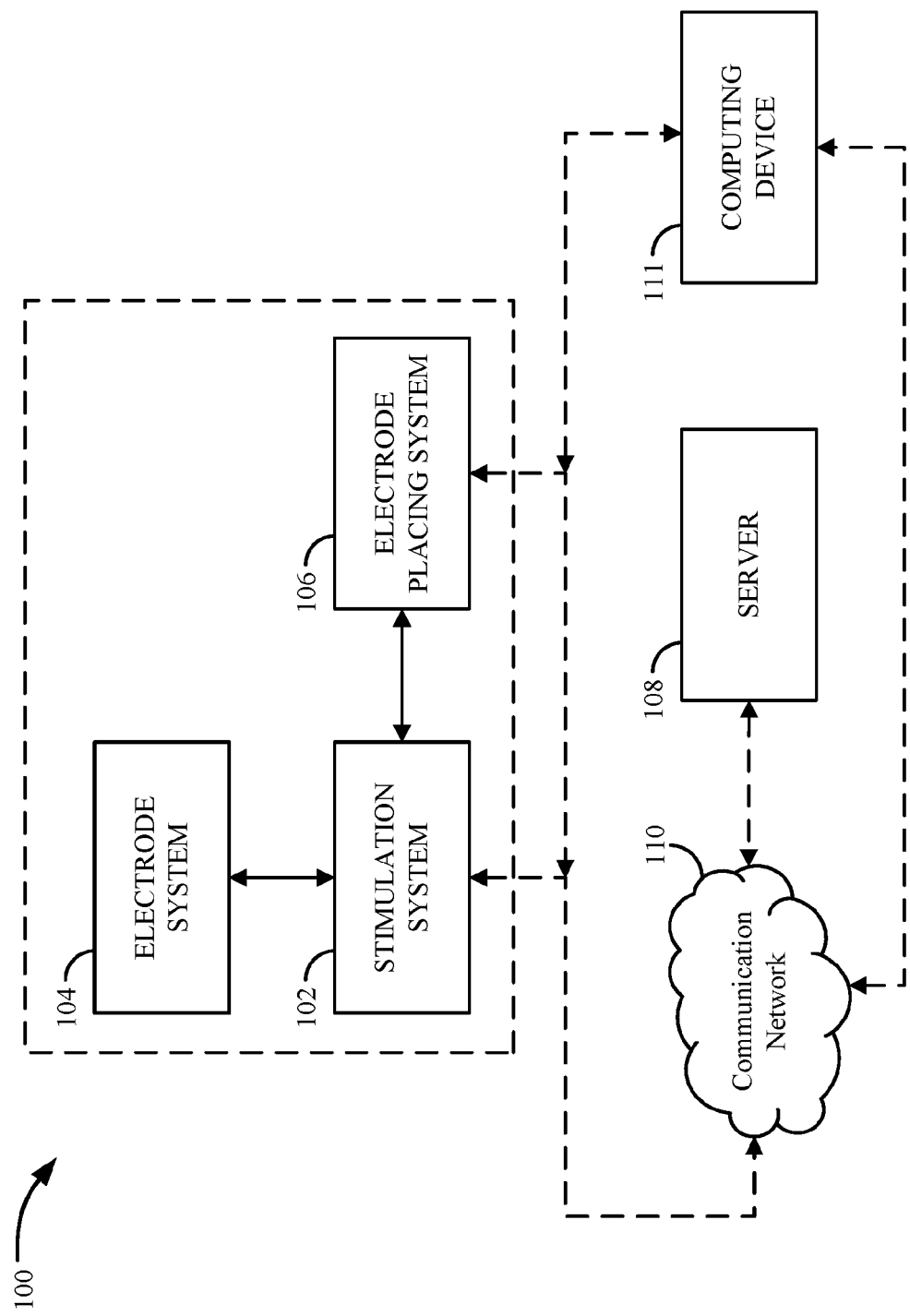
FIG. 1 shows a block diagram of a neuromodulation system, according to some embodiments of the present disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the use the phraseology and terminology used herein is for the purpose of description and should not be regarded as limiting. Furthermore, the use of "right", "left", "front", "back", "upper", "lower", "above", "below", "top", or "bottom" and variations thereof herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Unless otherwise specified or limited, phrases similar to "at least one of A, B, and C," "one or more of A, B, and C," and the like, are meant to indicate A, or B, or C, or any combination of A, B, and/or C, including combinations with multiple or single instances of A, B, and/or C.

As used herein, the term, "controller" includes any device capable of executing a computer program, or any device that includes logic gates configured to execute the described functionality. For example, this may include a processor, a microcontroller, a field-programmable gate array, a programmable logic controller, etc.

Described here are systems and methods for unattended delivery of cognitive neuromodulation therapy. In some embodiments of the present disclosure it is contemplated to provide an integrated cognitive neuromodulation therapy delivery system that allows individuals to utilize these newly available and groundbreaking treatments. As described above, current neuromodulation systems require professional oversight throughout all processes of the procedure. This can deter individuals from seeking this treatment for at least two reasons. First, this requires the individual to be physically present at the healthcare office, and thus imposes inconveniences for the user (e.g., scheduling, missing work, etc.). Second, constant oversight at the healthcare office can be extremely costly, especially considering that neuromodulation therapy typically requires multiple visits. Thus, what is needed is a neuromodulation system that can be safely and effectively administered by the patient at home, or which otherwise supports the training of patients, prescribers, and clinical staff through online, interactive training and testing, which can ultimately lead to certifications. Once trained and certified, prescribers will be able to prescribe a specific treatment for their patient. Conversely, once the patient is prescribed the neuromodulation treatment, the patient can receive the specialized treatment delivery equipment, and can be instructed online or in the office by the certified and trained clinical staff.

The specialized treatment delivery equipment can include several parts: (1) a custom appliance with a screen, a keyboard, a camera, a microphone, and headphones; (2) a neuromodulation stimulation unit; and (3) an electrode assembly, which may in some instances include electrodes coupled to a headpiece or cap. The custom appliance can be internet capable to support real-time treatment monitoring and adjustment, and can connect to a server which can deliver the prescribed treatment parameters, such as frequency or length. In some instances, facial and voice recognition technology can be used to verify the identity of the patient. Similarly, the camera can verify a user, and can verify the proper placement of the electrode assembly using computer vision algorithms implemented with a hardware processor and a memory. The prescribed treatment can be downloaded and applied, or can be retrieved from a memory or other data storage device or medium. The appliance can communicate wirelessly with the stimulation unit, and thus controls the timing and intensity of the stimulation delivered, synchronizing with the training tasks and monitoring the current delivered. Utilizing the camera, the neuromodulation system can also be programmed to verify the continued presence of the patient and their attention to provided tasks. A summary of each treatment session can be maintained on the server where it can be shared with the prescriber/clinical staff via electronic transfer with the electronic medical record.

FIG. 1 shows an example of a neuromodulation system 100, according to some embodiments of the disclosure. The neuromodulation system 100 can include a stimulation system 102, an electrode system 104, and an electrode placing system 106. As will be described in more detail below, the stimulation system 102 can provide electrical signals to one or more electrodes within the electrode system 104. In some instances the electrical signals can be direct current ("DC"), alternating current ("AC"), or pulsed voltages or currents. In some specific implementations, the electrical signals can be random noise (e.g., to provide a random noise stimulation). Although the stimulation system 102 is illustrated as being separate from the electrode system 104, in some scenarios, the stimulation system 102 can be packaged within the electrode system 104 (e.g., coupled to a headpiece that includes the electrodes). The electrode placing system 106, allows the electrode system 104 to be accurately placed on an individual, such that when the stimulation system 102 electrically excites the electrodes, the electrical stimulation is delivered to the correct anatomical region of the user. FIG. 1 also shows a server 108 in communication with the stimulation system 102 and the electrode placing system 106, via a suitable communication network 110. The server 108 (e.g., via the communication network 110) can control the stimulation system 102, and the electrode placing system 106, and can send and receive data between the components. For example, the electrode placing system 106 and the stimulation system 102 can monitor the amount of current delivered to the electrodes, which can be relayed to the server 108, and thus to other components also connected to the server 108.

In some embodiments, the neuromodulation system 100 can include a computing device 111 that can be in communication with the server 108 (e.g., via the communication network 110), with the electrode placing system 106, and with the stimulation system 102. The communication abilities of the computing device 111 can allow data, instructions, etc., from the other components to be transferred to or from the computing device 111. For example, the computing device 111 can be a computer controlled by a practitioner (e.g., at a doctor's office), thus allowing the practitioner to analyze data received from the stimulation system 102 (or electrode placing system 106) and to enable either directly, or indirectly (e.g., by enabling usage) the stimulation system 102 to provide the electrical signals to the electrode system 104. In some cases, the computing device 111 (e.g., via an instruction by the practitioner), can modify the stimulation parameters, and cause the stimulation system to implement the modified simulation parameters.

The computing device 111 can be typically structured, and can include a processor, memory, communication systems, a display, inputs (e.g., a mouse, a keyboard, etc., to provide a user input to the computing device 111).

In some embodiments, the electrode placing system 106, can run a secure application that is used to communicate, and to control the stimulation system 102. The electrode placing system 106 can check and download updates to this secure application to appropriately update the secure application. This checking, can be implemented at regular time intervals (e.g., weekly). In some embodiments, the electrode placing system 106, via the secure application, can (wirelessly) communicate with the server 108, running a corresponding application that communicates with the secure application, to schedule a future neuromodulation session, or modify current treatment parameters (e.g., type of electrical signal supplied to the electrode system).

In some embodiments, the firmware of the stimulation system 102 can be updated without the need for a manual connection (e.g., a direct connection to the electrode placing system 106). In particular, the stimulation system 102 can communicate wirelessly with the electrode placing system 106 (or other suitable computing device, such as the server 108 over the communication network 110) to download and install the firmware update.

Figure 2:
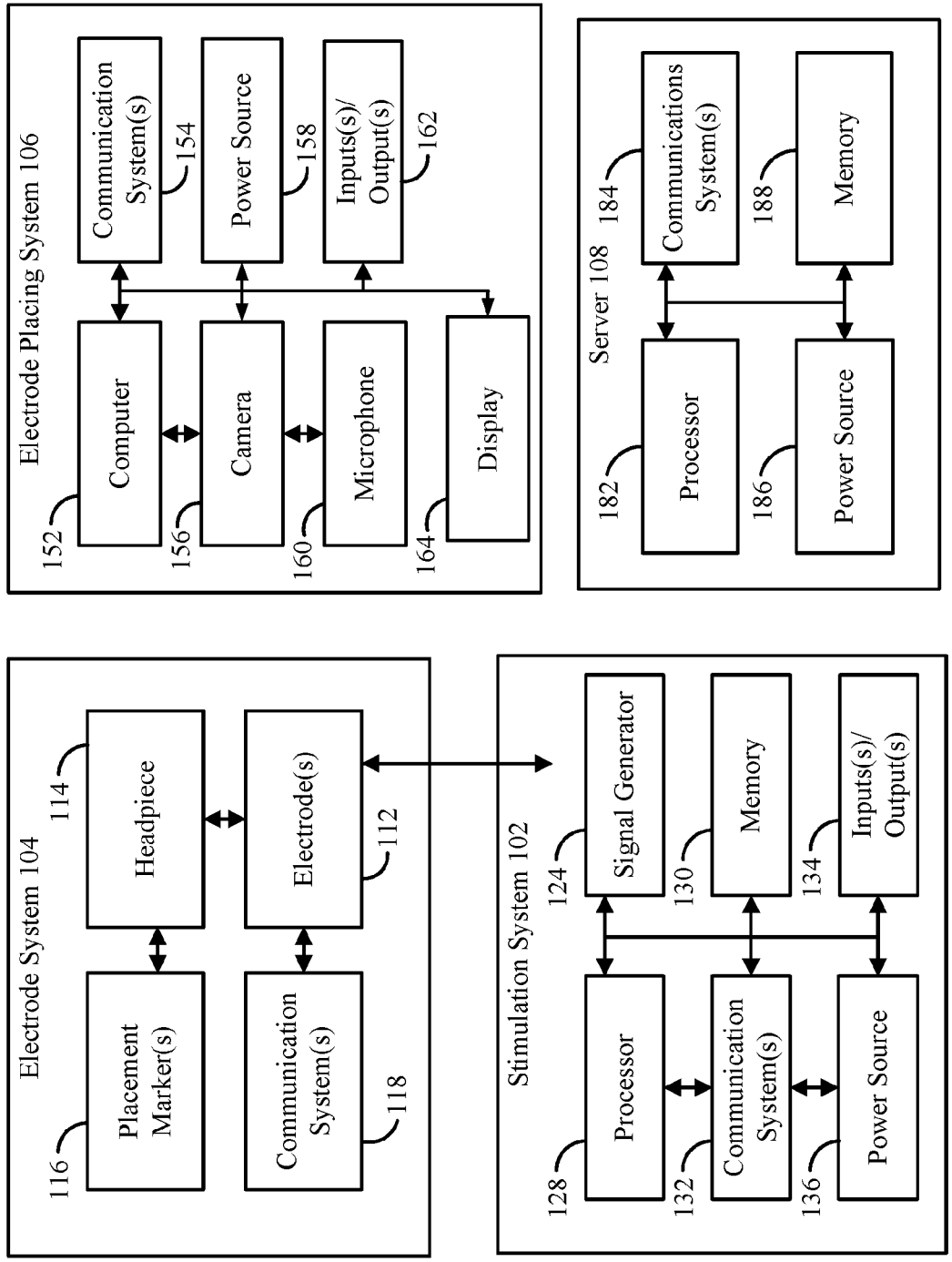
FIG. 2 shows an example of components within the neuromodulation system of FIG. 1.

FIG. 2 illustrates an example of components within the neuromodulation system 100, and the server 108. The electrode system 104 includes one or more electrodes 112, a headpiece 114, at least one placement marker 116, and one or more communication system(s) 118. The one or more electrodes 112 are configured to receive or transmit electrical signals (e.g., receive voltages, and transmit currents), and are coupled to the headpiece 114. The at least one placement marker 116 is also coupled to the headpiece 114, and in some embodiments, a portion of the one or more electrodes 112 can be the placement marker 116. For example, a back surface of the one or more electrodes 112 (i.e., the surface opposite the delivery/receiving surface of an electrode) can be the placement marker 116. In some embodiments, the at least one placement marker 116 can include a color variation, stitching, visual indicator, marker, shape, etc., on the headpiece 114. The spatial relationship between the placement marker 116 and the one or more electrodes 112 is constant and known information, and thus the location of the placement marker 116 can be used to determine the location of the one or more electrodes 112. By determining the spatial relationship of the placement marker 116 relative to an anatomical feature, then, the correct placement of the electrodes 112 can be verified. The one or more communication system(s) 118 can include any suitable hardware, firmware, and/or software for communicating with the electrode placing system 106, the stimulation system 102, the server 108, and the computing device 111 over any suitable communication networks. For example, communications system(s) 118 can include one or more transceivers, one or more communication chips and/or chip sets, etc. In a more particular example, communications system(s) 118 can include hardware, firmware and/or software that can be used to establish a coaxial connection, a fiber optic connection, an Ethernet connection, a USB connection, a Wi-Fi connection, a Bluetooth connection, a cellular connection, etc.

FIG. 2 also illustrates the stimulation system 102, which includes a signal generator 124, a processor 128, memory 130, communication system(s) 132, input(s)/output(s) 134, and a power source 136. The signal generator 124 includes components for providing electrical stimulation to the electrode(s) 112. In some embodiments, an electrical cord of the electrode(s) 112 is manually inserted into an electrode port(s) within the signal generator 124 thereby allowing electrical communication between the signal generator 124 and the electrode(s) 112.

The processor 128 within the stimulation system 102 can be any suitable hardware processor or combination of processors, such as a central processing unit ("CPU"), a graphics processing unit ("GPU"), etc., which can execute a program (e.g., retrieved from memory 130) that can include the processes described below.

The memory 130 can include any suitable volatile memory, non-volatile memory, storage, or any suitable combination thereof. For example, the memory 130 can include random-access memory ("RAM"), static random-access memory ("SRAM"), read-only memory ("ROM"), electrically erasable programmable read-only memory ("EEPROM"), one or more flash drives, one or more hard disks, one or more solid state drives, one or more optical drives, etc. In some embodiments, the memory 130 can have encoded thereon a computer program for controlling operation of the processor 128. The communication system(s) 132 of the stimulation system 102 is identical to the communication system(s) 118 previously described, thus what pertains to the communication system(s) 118 also pertains to the communication system(s) 132. The communication system(s) 132 can communicate with the electrode system 104, the electrode placing system 106, the server 108, and the computing device 111 over any suitable communication networks.

The power source 136 of the stimulation system 102 can embody many different forms. For example, the power source 136 can be a hardwired connection (e.g., a Universal Serial Bus connection), or it can be an electrical storage device (e.g., a battery). As one non-limiting example, the power source 136 can be a rechargeable battery, which can be charged via connection with an external power transformer. In these instances, and in order to prevent potential electrical shock, the stimulation system 102 can be designed such that electrical stimulation cannot be provided if the power source 136 is connected to the external power transformer or to a wall outlet. For instance, electrical connection to the electrodes 112 can be disabled if the rechargeable battery is being charged.

The power source 136 can supply power to all components within the stimulation system 102. The input(s)/output(s) 134 of the stimulation system 102 can be indicators, sensors, actuated buttons, etc. For example, the inputs(s)/output(s) 134 can include light emitting diodes ("LEDs"), which can provide indication that the stimulation system 102 is powered on, and can indicate if the signal generator 124 is supplying electrical stimulation to the electrode(s) 112. Additionally or alternatively, sensors or LEDs can indicate the magnitude, duration, or both of the current/voltage supplied to the electrodes 112, via the signal generator 124.

FIG. 2 also illustrates the electrode placing system 106, which includes a computer 152, communication system(s) 154, a camera 156, a power source 158, a microphone 160, input(s)/output(s) 162, and a display 164. Although the electrode placing system 106 is illustrated as having these specific components, in alternative embodiments, the electrode placing system 106 can be a personal computer, a tablet, a smartphone, or other devices known in the art. The computer 152 can include one or more processors and memory, which have been described with regard to the processor 128 and the memory 130, and can also include a user interface, a display, etc. The communication system(s) 154 of the electrode placing system 106 is identical to the communication system(s) 118 previously described, thus what pertains to the communication system(s) 118 also pertains to the communication system(s) 154. The communication system(s) 154 can communicate with the electrode system 104, the stimulation system 102, the server 108, and the computing device 111, over any suitable communication networks. The power source 158 powers all components within the electrode placing system 106 and is similar to the power source 136, thus what pertains to the power source 136 may also pertain to the power source 158. The camera 156 within the electrode placing system 106 can include image sensors, lenses, prisms, etc., to effectively capture images. In some embodiments, the camera 156 is a color camera (e.g., having a color image sensor). In some embodiments, the camera 156 can be a stereoscopic camera, or other imaging sensor configured to acquire three-dimensional ("3D") imaging data of the user. Additionally, in some cases, the camera 156, as appropriate, can triangulate the 3D location of features in the acquired 3D imaging data relative to the a specific coordinate system (e.g., relative to the camera 156). For example, the 3D imaging data can be used to determine the 3D distance between a given anatomical feature and the camera, and the 3D distance between the placement marker 116 and the camera. Both of these 3D distances can then be used to determine the relative distance between the given anatomical feature and the placement marker 116.

Similarly, the microphone 160 can include filters, amplifiers, etc., to effectively capture auditory signals. The input(s)/output(s) 162 can include the inputs previously described with regard to the input(s)/output(s) 134, and can include a keyboard, a mouse, etc., such that a user can interact with the electrode placing system 106. In some configurations, the input(s)/output(s) 162 can include a user interface that enables a user to perform a cognitive training task. For instance, the user interface may include a display, speaker(s), or other suitable output for providing instructions or stimuli to the user for administering the cognitive training task.

In some embodiments the display 164 can be part of the computer 152, or separate from the computer 152. In some embodiments, the display 164 can present a graphical user interface. In some embodiments, the display 164 can be implemented using any suitable display devices, such as a monitor, a touchscreen, a television, etc. In some embodiments, the input(s)/output(s) 162 of the electrode placing system 106 can include indicators, sensors, actuatable buttons, a keyboard, a mouse, a graphical user interface, a touch-screen display, etc., so as to interact with images presented on the display 164 (e.g., the graphical user interface).

FIG. 2 illustrates the server 108, which can include a processor 182, communication system(s) 184, a power source 186, and memory 188. All of these components within the server 108 have been previously described, and thus the previous descriptions of these components may also pertain to the components within the server 108. The server 108 can communicate (e.g., via the communication system(s) 184) with the electrode system 104, the electrode placing system 106, and the stimulation system 102, and the computing device 111, over suitable communication networks.

Figure 3:
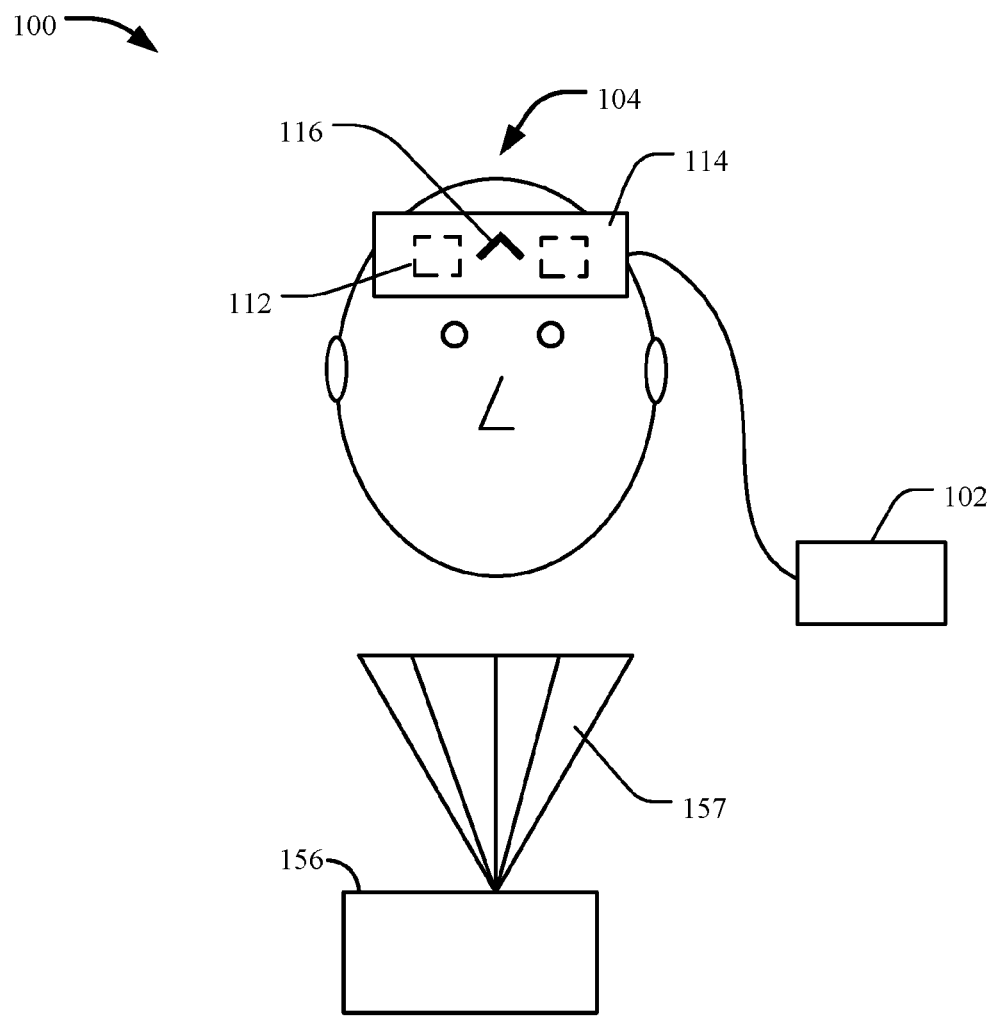
FIG. 3 shows a generalized usage of the neuromodulation system of FIG. 1.

FIG. 3 shows a generalized usage of the neuromodulation system of FIG. 1. As illustrated, the headpiece 114 conforms and contours the user's head, and also includes two electrodes 112 fixed to a portion of the headpiece 114. In some cases, the headpiece 114 can include Velcro straps, elastic bands, or adhesives to secure the headpiece 114 to the user's head. In other embodiments, the headpiece 114 can be configured as a cap, similarly to an electroencephalogram ("EEG") cap. Disposed on a surface of the headpiece 114 is a placement marker 116, which is positioned with a known spatial relationship relative to the electrodes 112. The placement marker 116 is arranged on a surface of the headpiece 114 such it faces the optical path 157 of the camera 156 within the electrode placing system 106. In this example, the placement marker 116 is shown as a triangular feature, which may be stitching in the headpiece 114. In other embodiments the placement marker 116 can take on other forms, as discussed above. In some configurations, the placement marker 116, or a plurality of such placement markers 116, can be spatially overlapped with a corresponding electrode 112. However, as noted above, the placement marker(s) 116 need not be disposed directly above a corresponding electrode 112, and rather each placement marker 116 can be arranged in any suitable manner on the headpiece in which a known spatial relationship is defined between a placement marker 116 and one or more of the electrodes 112 (e.g., each placement marker 116 can be moved with respect to a corresponding electrode 112). In some embodiments, a headpiece 114 may have a single placement marker 116 that is spatially equidistant between two electrodes 112. Generally, the placement marker 116 is optically differentiated from the surface of the headpiece 114 (or other support structure that is coupled to the electrodes 112). This way, the electrode placing system 106 can use the camera 156 to acquire images of the user with the headpiece 114, and can subsequently discern the location of the placement marker 116 relative to an anatomical feature of the user. Additionally, because the location of the placement marker 116 relative to the electrodes 112 is known, the location of the electrodes 112 relative to the anatomical feature can be determined.

The camera 156 within the electrode placing system 106 acquires images of the user, such as one image before and one image after placing the electrode system 104 on their head. The acquired image of the user prior to wearing the electrode system 104 can be processed (e.g., by the processor within the electrode placing system and via image processing algorithms) to determine unique visual characteristics of the user. These unique visual characteristics can include sizes, location, or contours of anatomical structures, spatial relationships between anatomical structures, and so on. This image can in some instances be used to verify the user against a corresponding patient profile, based on the unique visual characteristics of the user. The electrode placing system 106 can determine whether the user has placed the headpiece 114 in the correct location, via the spatial relationship between the placement marker 116 and an anatomical feature of the user. For instance, an image of the user wearing the headpiece 114 can be processed to determine a spatial relationship between the placement marker 116 and an anatomical feature, such as a predefined point on the user's forehead. Thus, as described above, because the location of the electrodes 112 are known relative to the placement marker 116, this can verify whether the electrode(s) 112 have been correctly positioned by the user for delivery of electrical stimulation treatment.

Figure 4:
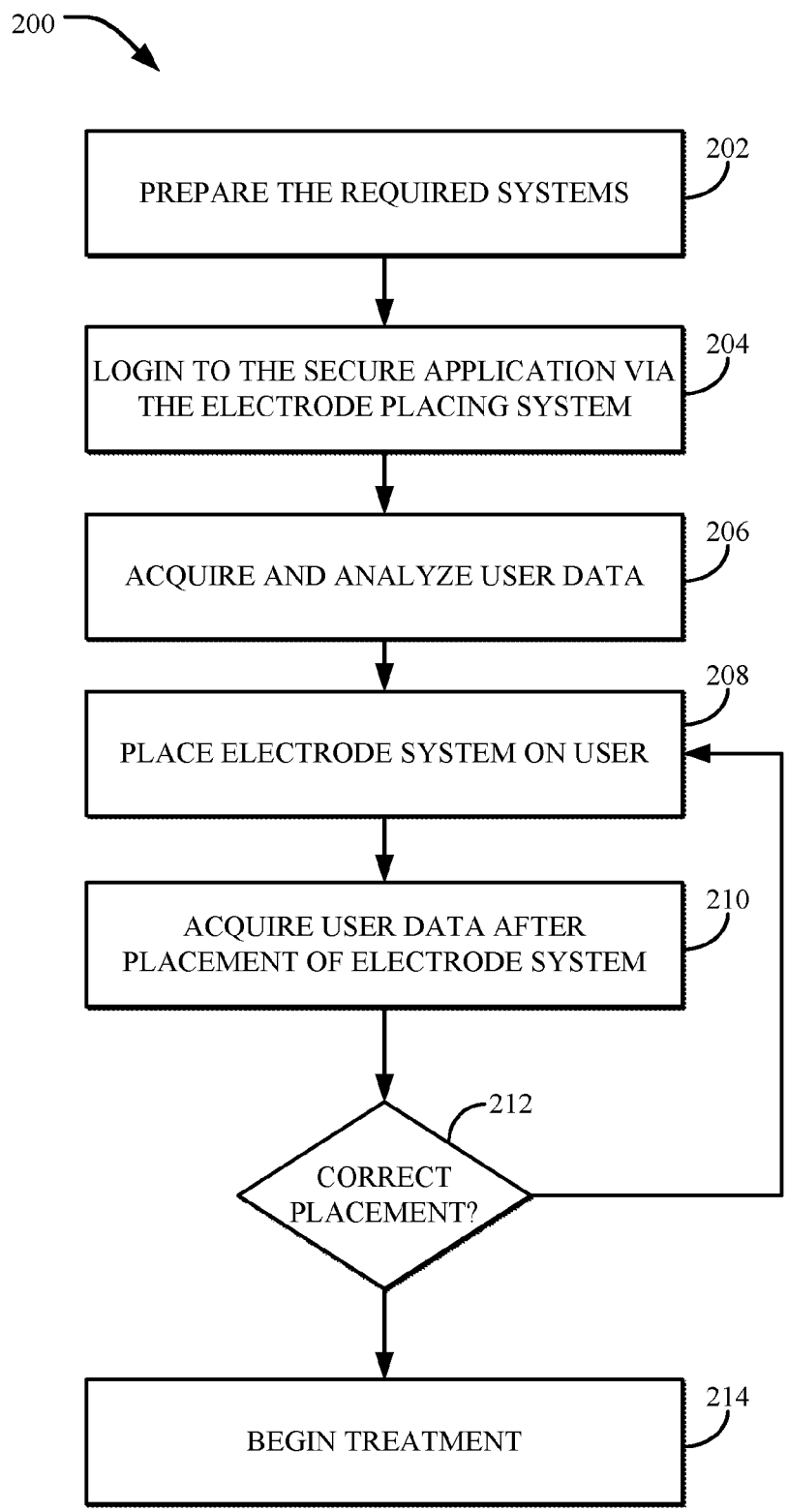
FIG. 4 shows a flowchart of a neuromodulation process.

FIG. 4 is an example of a process 200, relating to the previously described figures, and thus process 200 will be described in view of the previously described components. At 202, process 200 can include preparing the required systems. This step can include ensuring that all devices are powered on, communicating properly, and ensuring that the user effectively understands how to operate the systems correctly. Additionally, prior to placing the headpiece (e.g., headpiece 114) on the user's head, the user may in some instances prepare the electrodes (e.g., electrodes 112) to effectively conduct current used for neuromodulation, which can be completed by applying a conductive aid (e.g., a saline solution) to the electrode surface that contacts the user's head.

At 204, process 200 can include the user logging into the secure application via the electrode placing system (e.g., the electrode placing system 106). The secure application can allow a healthcare professional (e.g., a physician, a nurse, etc.) to interact with the user (e.g., via the camera 156, and the microphone 160). The healthcare professional can access the secure application by using a computer, computing device, etc., (e.g., the computing device 111) that is in communication with the server (e.g., the server 108), which the user is accessing to login to the secure application. The secure application can store user specific information that can include visual information of the user and auditory information of the user (e.g., the user saying a phrase), which will be described in more detail below. The user specific information can include the name, address, age, etc., of the individual, and can include health record data (e.g., current prescriptions, height weight, etc.). In some cases, the secure application can store the required neuromodulation prescriptions for the particular user, which can be entered and uploaded by the healthcare professional based on the user's condition/diagnosis. For example, these can include the prescribed number of electrodes, the prescribed location of the electrodes on the user, the prescribed electrical stimulation parameters (e.g., the magnitude of current, and duration of stimulation), the prescribed duration of the neuromodulation therapy session and the specific cognitive training tasks that may be presented to the user.

At 206, the process 200 can include acquiring and analyzing user data. The electrode placing system (e.g., the electrode placing system 106) can acquire an image of a user's head, before the user places the electrode system on their head. This image can be processed by computer vision algorithms (e.g., implemented with the processor of the computer 152 or on the server) to determine sizes and relationships between anatomical features of the user's head (e.g., spatial relationships, coloring, etc.). Then, these anatomical features, which are unique to an individual, can be compared to previously acquired anatomical features (e.g., stored in the server 108) that can verify the user against the profile of the user to ensure consistency between the two. If the electrode placing system 106 determines a discrepancy between the two, the user may be logged out of the secure application and prevented from logging in. In some embodiments, it may be necessary to acquire multiple images of the user, where each image has a different view of the individual's head. For example, the user may rotate their head about a vertical axis, while the electrode placing system acquires multiple images in a panoramic fashion. Then, these multiple images can be processed appropriately to determine the anatomical features.

In some cases, acquiring user data can include acquiring 3D imaging data from the user. As described above, this can be completed with a single imaging sensor, acquiring multiple images as the user rotates about an axis (e.g., rotates their head), or in some cases, this can be completed with a stereoscopic camera (or other 3D acquiring imaging sensor or camera).

Similarly to the visual verification, the user's audible speech can be captured (e.g., via the microphone 160), and by using digital signal processing algorithms can be compared to previously acquired audible speech signals of the user to ensure consistency between the two. If the electrode placing system 106 determines a discrepancy between the two, the user may be logged out of the secure application and prevented from logging in. In alternative embodiments, the healthcare professional can communicate with the user, via the electrode placement system (e.g., electrode placing system 106), to verify the user's identity. Once the user has been verified (e.g., visually, audibly, or both), process 200 can proceed.

Figure 5:
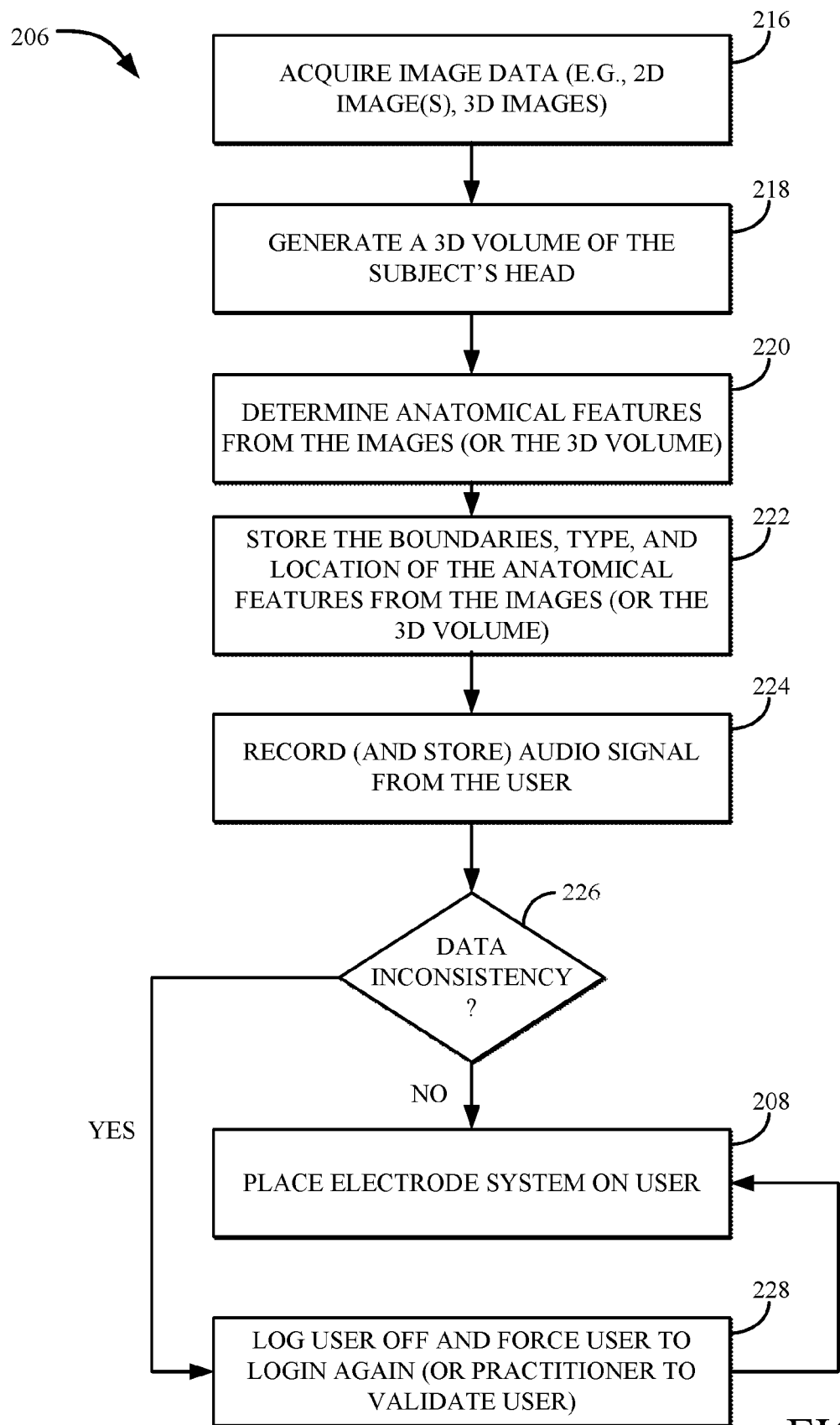
FIG. 5 shows a flowchart of a sub-process within the process of FIG. 4.

FIG. 5 shows an example of a flowchart of a sub-process 206 of process 200. Some or all of the portions of the sub-process 206 can be implemented on a suitable computing device. At 216, sub-process 206 can include acquiring image data of the user. In some embodiments, a suitable computing device (e.g., of the electrode placing system 106) can cause a suitable imaging sensor (e.g., the camera 156) to acquire a single two-dimensional ("2D") image, multiple 2D images (e.g., as the user rotates), or 3D imaging data (e.g., from a stereoscopic imaging device).

At 218, sub-process 206 can include generating a 3D volume of the subject's head. In some cases, such as when only utilizing 2D imaging, 218 can be omitted. In other cases, the generation of the 3D volume of the subject's head can be particularly helpful for determining anatomical features, as the surfaces profile of the anatomical features can be pronounced when using 3D imaging acquisitions.

At 220, sub-process 206 can include determining anatomical features from the images (or the 3D volume). In some configurations, such as when utilizing 2D images the anatomical features can be automatically determined by optical differences in regions of the subject. For example, one specific anatomical feature can be a nose of a subject, which can have different surface textures, indicated by the suitable computing device as different optical regions within the image, as compared to adjacent surrounding regions. In some embodiments, such as with a 2D color camera, some anatomical features can have different (and unique) color variations compared to adjacent surrounding regions. In some configurations, as described above, these anatomical features can be automatically determined by computer vision algorithms. Additionally, in some cases, the suitable computing device can allow a user (e.g., the practitioner, via the computing device 111) to select specific portions of the image to manually determine regions of the image that are anatomical features. For example, the suitable computing device can receive a user input that indicates a region within the image that is to be an identified anatomical feature (and label the anatomical feature accordingly). This manual configuration can be desirable to ensure that the system, if using automatically determined anatomical features (e.g., via computer vision algorithms), is correctly identifying particular anatomical features. Thus, in some cases, the suitable computing device (via a user input) can override (e.g., remove) previously automatically located anatomical features of the 2D image.

In some configurations, the 3D volume of the subject's head can be used to extract the anatomical features. For example, some anatomical features can have consistent curvatures for the same feature between individuals (e.g., the nose), but largely different than other anatomical features and surrounding adjacent regions of the subject's head. Thus, with appropriate thresholds, for example, the suitable computing device can automatically determine anatomical features from the 3D volume of the subject's head. Similarly, to the 2D configuration, a user can manually select (e.g., via a user input to the suitable computing device) and tag particularly portions of the 3D volume as anatomical features. Additionally, in some cases, the suitable computing device (via a user input) can override (e.g., remove) previously automatically located anatomical features of the 3D volume.

In some embodiments, along with the boundaries of the anatomical features other data (or information) related to the anatomical features can be determined. For example, in the 2D configuration, the distance between a reference point (e.g., determined by a user input, or an edge of an image) and each anatomical feature can be determined. Additionally, in the 3D configuration, the 3D distances between the imaging sensor (e.g., camera) and each anatomical feature can be determined. Thus, the relative 3D distances between corresponding anatomical features can be determined (e.g., by subtracting the distances).

Figure 6:
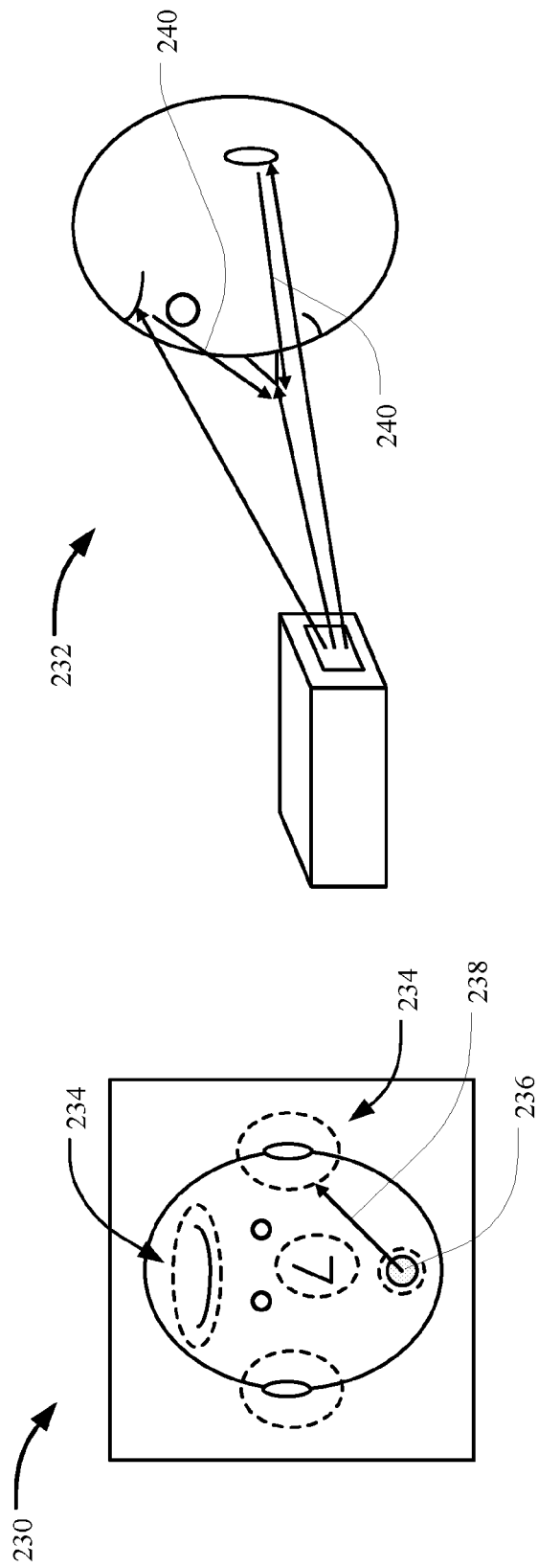
FIG. 6 shows on the left side, an illustration of an image, and on the right side, an illustration of an electrode placing system having distance measuring capabilities.

FIG. 6 shows an illustration of an image 230 on the left side, and an illustration of an electrode placing system 232 having distance measuring capabilities (e.g., 3D imaging) feature on the opposite side. The image 230 (presented on a display such as the electrode placing system), which demonstrates the 2D configuration, shows sub regions 234 of the image 230 that have been identified as anatomical features. The sub regions 234 can have different shapes (e.g., circles), sizes, and can span at least a portion of a given anatomical feature. In some cases, as described above, a reference point 236 can be on the image (e.g., which can be an anatomical feature as well, such as the chin in this case), which along with the spatial coordinates of each anatomical feature can be used to determine the relative distance between the reference point 236 and the anatomical feature. For example, FIG. 6 shows a distance 238 between the reference point 236 and the anatomical feature being the ear. This distance 238 can be used for various purposes. For example, assuming that the orientation of the user is relatively constant between images, the distance 238 should be substantially uniform for each subsequently acquired image. So, this distance 238 can then be used as a reference to determine the location of the electrodes. As another example, if the distance 238 is substantially different between images, this can inform the electrode placing system 106 that the user's head is in a different orientation (e.g., when a user's head is tilted back). The electrode placing system 106 can then require that the user orient their head to the correct orientation (e.g., the orientation that determined the distance 238). As yet another example, assuming that the orientation of the user's head is relatively constant between images, the distance 238 can be compared to another distance (e.g., stored), and as described below, to confirm the user's identity.

FIG. 6 also shows an illustration of the electrode placing system 232 that has distance measuring capabilities. In this implementation, the electrode placing system 232 can acquire 3D imaging data of the user, can determine the anatomical features, and can determine the distance from the camera of the electrode placing system 232 to each identified anatomical feature. Then, the distances between respective anatomical features (or a reference point) can be determined (e.g., from the distances from the imaging sensor to each identified anatomical feature). These respective distances 240 between respective anatomical features (or an anatomical feature and a reference point) can be used in a similar manner as the distance 238.

At 222, sub-process 206 can include storing the boundaries, type, and locations of the anatomical features within the 2D image, or the 3D volume. The boundaries can be the spatial region within the image or the 3D volume, the type can be the type of anatomical feature, such as, for example, a nose, an ear, a portion of the forehead, etc., and the locations can be the relative locations between respective anatomical features (or a reference point). In some configurations, the boundary, type, and location, can be stored with the specific anatomical feature. This data can be stored in the stimulation system, the electrode placing system, the server, the computing device, or other suitable computing devices.

At 224, sub-process 206 can include recording (and storing) an audio signal from the user. If this is the first time the subject is receiving neuromodulation, the audio signal can be recorded and saved, such as to identify the subject for future use. In some cases, recording (and storing) the audio signal can require a user to state a unique phrase (from their perspective) or a readily known greeting (e.g., such as "hello").

At 226, sub-process 206 can include determining whether there is an inconsistency with the acquired data (e.g., optical, such as imaging data, or audio data). In some cases, the processes to determine the unique anatomical features (and distances between) can be used to set-up future authorization of the neuromodulation system (e.g., future identification of the individual). In some cases, the unique distances between anatomical features can be compared to previous unique anatomical distance determinations to determine if there is an inconsistency. In some cases, the image (or 3D model) can be compared to previously acquired images (or 3D models) to determine if there is an inconsistency between them (e.g., greater than a threshold amount). Similarly, the audio signal acquired from the user can be compared to previously acquired audio signals from the user to determine if there is an inconsistency between them. If 226 of sub-process 206 determines that there is no inconsistency, sub-process 206 can proceed to 208 of process 200. Alternatively, if 226 of sub-process 206 determines that there is an inconsistency, sub-process 206 can proceed to 228 of sub-process 206.

At 228, sub-process 206 can include logging the user off and forcing the user to login again, such as routing the subject back to 204 of process 200. In some cases, if there is an inconsistency determined at 226, a practitioner (e.g., via the computing device 111) can validate the user's identity, by instructing the suitable computing device (e.g., by a user input) to bypass the authentication so that the subject can proceed to placing the electrode system on themselves at 208 of process 200.

At 208, the process 200 can include placing the electrode system (e.g., the electrode system 104) on a user's head. The user places the headpiece (e.g., headpiece 114) such that the surface of the electrodes (e.g., the electrodes 112) that includes a pad, metal, or other conductive interface is contacting their head. In some cases, the headpiece (e.g., the headpiece 114) of the electrode system (e.g., the electrode system 104) includes an elastic band or Velcro strap, which the user manipulates in order to secure the headpiece (e.g., the headpiece 114) to the user's head. In some embodiments, the display of the electrode placing system (e.g., implemented with the computer 152 of the electrode placing system 106) can present an image showing the intended location of the headpiece on the user's head (as described in more detail below). In other embodiments, the healthcare professional can provide auditory or visual cues to the user to aid the user in placing the electrode system on their head. Once the electrode system has been placed on the user's head, the user can interact with the user interface (e.g., by clicking a box on a graphical user interface), which can allow the process 200 to proceed. In other scenarios, the process 200 can proceed forward in real-time, without intervention by the user.

At 210, the process 200 can include acquiring data after placement of the electrode system. As detailed above, the electrode placing system (e.g., the electrode placing system 106) can acquire additional images (e.g., one, two, three, etc.) of the user with the electrode system on their head. These images can be processed by computer vision algorithms (e.g., implemented with the processor of the computer 152) to determine sizes and relationships between anatomical features of the user's head. These images can also be processed by computer vision algorithms (e.g., implemented with the processor of the computer 152) to determine the spatial relationship between the one or more placement markers and the anatomical features of the user's head. As noted above, the location of the one or more placement markers have a known spatial relationship relative to the electrodes. For instance, in some configurations the one or more placement markers can spatially overlap with the one or more electrodes. Thus, the electrode placing system can analyze whether the electrodes are aligned with the desired predetermined anatomical location(s) for the electrodes as prescribed by the healthcare professional.

Figure 7:
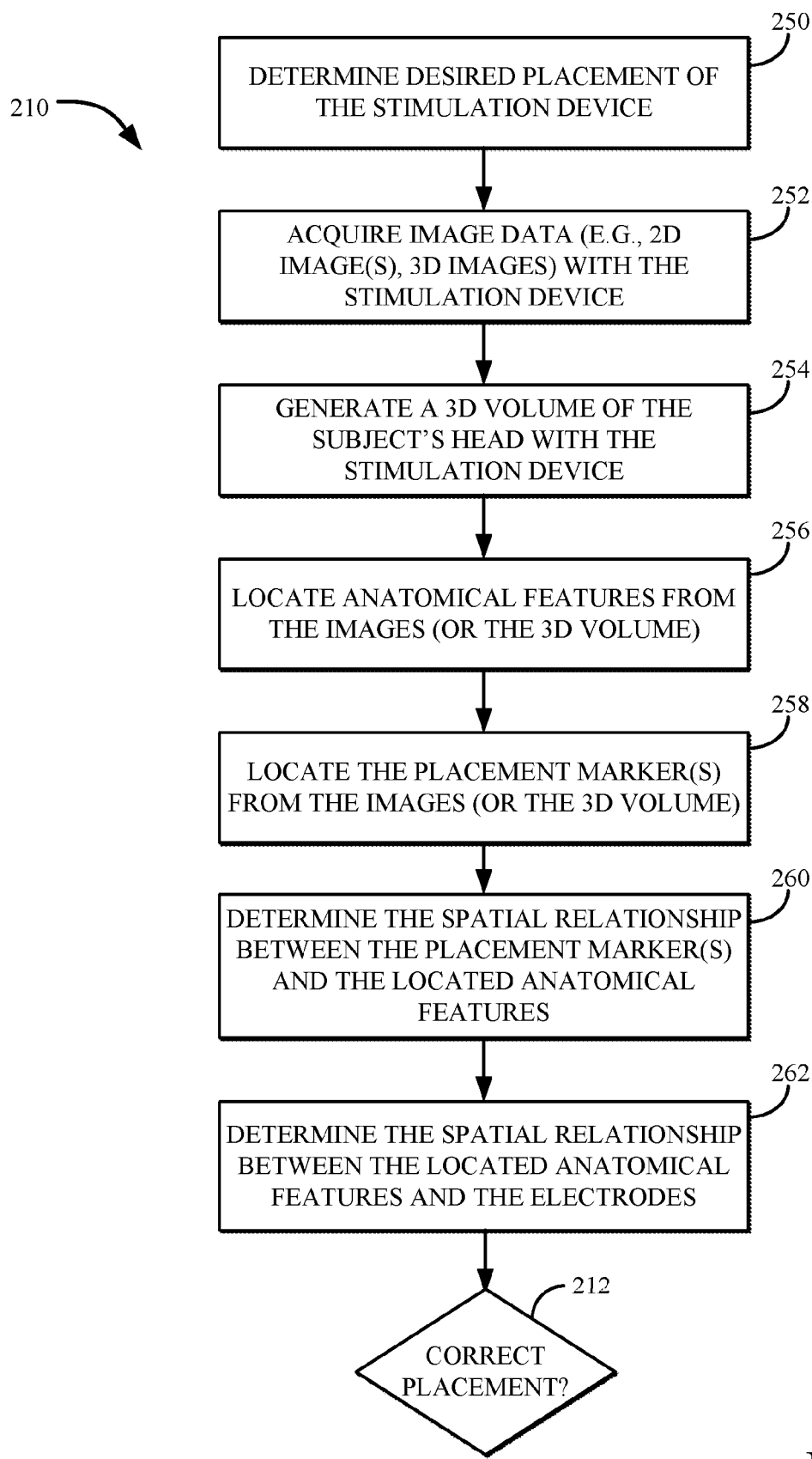
FIG. 7 shows a flowchart of another sub-process within the process of FIG. 4.

FIG. 7 shows an example of a flowchart of a sub-process 210 of process 200. Some or all of the portions of the sub-process 210 can be implemented on a suitable computing device. At 250, sub-process 210 can include determining the desired placement of electrode(s). In some embodiments, this can include locating (or superimposing) reference points of the 2D image (or the 3D model) and determining (and saving) the relative position (or distance) of the reference points. The reference points can be the direct desired positions of the electrodes, or in some cases, can be the indirect desired positions of the electrodes (e.g., the desired position of the placement marker.

At 252, sub-process 210 can include acquiring imaging data (e.g., 2D imaging data, 3D imaging data, etc.) when the subject is wearing the electrode system (e.g., the headpiece). The imaging acquisition can be similar to 216 of sub-process 206, with the exception that at 252 the subject is wearing the electrode system, whereas at 216 the subject is not wearing the electrode system.

At 254, sub-process 210 can include generating a 3D volume of the subject's head with the electrode system secured to the subject. In some cases, such as when only utilizing 2D imaging, 254 can be omitted.

At 256, sub-process 210 can include locating the (previously determined) anatomical features from the images (or the 3D volume). In some embodiments, processes used with regard to sub-process 206 can also be used to identify the anatomical features in the images (or the 3D volume).

At 258, sub-process 210 can include locating the placement marker in the image or (the 3D volume). The placement marker can have an optical characteristic that is easily identifiable relative to the headband surface, and the head of the subject. So, the location of the placement marker either within the image, or the 3D volume, or the distance of the placement maker and a reference point (e.g., in an image, or the 3D distance) can be determined.

At 260, sub-process 210 can include determining the spatial relationship between the placement marker(s) and the located anatomical feature(s). In some embodiments, such as in the 2D configuration (e.g., with the single acquired image) with the boundary and location of the placement marker determined, and the boundary and location of the anatomical feature determined, the relative distance between the placement marker and the anatomical feature can be determined. In some embodiments, such as in the 3D configuration, with the (3D) distance between the image sensor and the anatomical feature determined, and with the (3D) distance between the image sensor and the placement maker determined, the relative distance between the anatomical feature and the placement marker can be determined (e.g., by subtracting the distances).

At 262, sub-process 210 can include determining the spatial relationship between the located anatomical feature(s) and the electrodes. In some cases, the placement maker is located on, is located in front of, or is located to surround a given electrode. Thus, in this case, no further determination needs to be conducted (e.g., because the location of the electrode is the same, or substantially the same, as the location of the placement marker). In some cases, if the placement marker is separated from, or separates the electrodes, the spatial distance between the placement maker and the electrodes are known. This, substantially constant spatial distance can be provided to the electrode positioning system (e.g., via a user input) and scaled appropriately for the given system (e.g., for the 2D image, or the 3D model). In some cases, the curvature of the band can be determined (e.g., by the 3D measurement system, by determining the curved shape of the band, or by utilizing a different image from a different plane). This curvature can be utilized to minimize errors in the assumption of relatively straight distances in the 2D configuration. In some embodiments, sub-process 210 can proceed to 212 of process 200 after determining that spatial relationship between the located anatomical features and the electrodes.

At step 212, the process 200 determines if the electrodes are placed correctly (e.g., via the electrode placing system 106). If the electrodes are determined to be placed incorrectly the process 200 repeats at step 208, indicating to the user to move the electrodes, and preferably indicating instruction on how to move the electrodes (e.g., the degree to which they should be moved, the direction in which they should be moved). In some cases, the electrode placement system determines whether the current spatial relationship of the electrodes relative to an anatomical feature is within a threshold. If the spatial relationship of the electrodes relative to an anatomical feature is outside the threshold the process 200 repeats at step 208. Conversely, if the spatial relationship of the electrodes relative to an anatomical feature is within the threshold, the process 200 can proceed. Regardless, if the electrode placement system determines at step 212 that the electrodes are correctly placed, process 200 can proceed.

In some embodiments, the previously determined reference point(s), which specify the desired location of the placement marker (or the electrodes, or both) can be used to determine the correct placement, and in some cases, also guide the user to place the stimulation device correctly. For example, the boundary and location for each reference point is substantially fixed, or in other words, the distance between the references points and a given anatomical features is substantially fixed (or is constant). This allows for the electrode placing system (or other suitable computing device) to determine if the placement is correct, and guide the user to the correct placement. Whether in the 2D configuration, or the 3D configuration, the relative (2D, or 3D) distances between the anatomical feature and the electrodes, and the anatomical feature and the reference point(s) is known. If these distances are substantially similar, or the difference in the distances is less than a threshold (e.g., the distances subtracted), the electrode placing system can determine that the electrode system is placed properly, or in other words, a given electrode is the reference point location.

In some embodiments, having two placement makers each substantially near a respective electrode can decrease the computational complexity (saving a calculation step), which can help in a real-time implementation.

FIGS. 8 and 9 show various illustrations demonstrating a user moving the electrode system to the location of the reference points. In particular, FIG. 8 shows, on the left side, an image 264, which can be presented on a display (e.g., the display of the electrode placing system), and on the right side an illustration of an electrode placing system 266 having distance measuring capabilities. The image 264 has sub regions identified as anatomical features 268, sub regions identified as reference points 270, and sub region(s) 272 identified as the placement marker(s) of the headpiece (or other mounting structure). As described in detail above, using an anatomical feature, the ear in this illustration as a reference location, the (2D) distance between a given electrode and the anatomical feature can be compared to the (2D) distance between a reference location for the given electrode (e.g., to ensure that headband or other mounting structure is not flipped) and the anatomical feature. This comparison can be implemented using the other electrode and the other reference location for the given electrode. As shown in FIG. 8, the distance 274 between the reference location and the given electrode exceeds (is greater than) a threshold distance, prompting the user to move the electrode to the correct location (e.g., by visual stimuli, auditory stimuli, etc.).

FIG. 8 also shows an illustration of the electrode placing system 266 that has distance measuring capabilities. In this implementation, the electrode placing system 266 can acquire 3D imaging data of the user, can determine anatomical features, can determine the placement marker, can determine the electrodes, can determine the reference location(s), and the distance from the camera and the determined features (e.g., anatomical features, electrodes, reference location(s)). Similarly, to the 2D system, but with 3D capabilities, the (3D) distance 276 between a reference location 278 and an electrode 280 can be determined. As shown, the (3D) distance 276 is greater than a threshold value (or that the 3D distances are not substantially similar), and thus the electrode placing system can prompt the user to move the electrode to the reference location.

FIG. 9 shows, on the left side, an illustration of an image 282, and on the right side an illustration of the electrode placing system 266. As shown in the image 282, the (2D) distance of the electrode to the anatomical feature, and the (2D) distance of the reference point to the anatomical feature are substantially identical, or the distance between them is below a threshold value. Similarly, the electrode placing system 266, the (3D) distance of the electrode to the anatomical feature, and the (3D) distance of the reference point to the anatomical feature are substantially identical, or the distance between them is below a threshold value.

At step 214, the process 200 begins treatment. The electrode placement system can instruct the stimulation system to deliver electrical signals to the electrodes. In some cases, the server alone, or upon instruction by the healthcare professional's computing device (e.g., via the stimulation system receiving the user input), can instruct the stimulation system (e.g., via the electrode placement system) to electrically deliver the patient-specific and prescribed therapy regimen (e.g., the corresponding duration, and amplitude, etc. of the electrical signal). For instance, the stimulation system can retrieve the appropriate electrical stimulation parameters for the user's prescribed therapy regimen from the server. During the treatment, the systems described above can monitor parameters related to the treatment. For example, components within the stimulation system 102 can monitor the electrical signal delivered to the electrodes (e.g., the duration, magnitude, waveform, etc.) and can relay these values back to the electrode placing system, the server, and to the healthcare professional's computing device.

Thus, the electrode placing system, the server, and the healthcare professional's computing device can ensure that the electrical stimulation parameters match the prescribed parameters by comparing the current or previously stored electrical stimulation parameters that have been sensed to the prescribed parameters. If there is a discrepancy between the sensed electrical signals and the prescribed electrical stimulation parameters, any one of the electrode placing system, the server, and the healthcare professional's computing device can instruct the stimulation system to stop emitting electrical signals from the signal generator, or the device can simply instruct the stimulation system to power down (e.g., turn off). Additionally, the user interface of the electrode placing system can provide auditory or visual cues to the user to remove the electrode system from their head, if there is a discrepancy between the sensed electrical signals and the prescribed parameters. In some embodiments, the user can perform a cognitive training task on the electrode placement system during step 214 (e.g., presented on the display of the electrode placing system). As an example, the cognitive training task can be customized to the user (e.g., based on past performance), and can be adjusted in difficulty (e.g., increased or decreased in difficulty depending on the performance of the user). Additionally or alternatively, the cognitive training task can be downloaded on the electrode placing system from the server. In some scenarios, a result, score, or other performance data, based on the user initiating/completing the cognitive training task can be stored on the electrode placing system and can be uploaded to the server. In other cases, the health professional can access this result, score, or other performance data.

In some embodiments, the placement of the electrode system can also be monitored during step 214 (e.g., steps 208 and 210 can run continuously while step 214 is executed). This ensures that throughout the duration of the treatment, the user has placed the electrodes on the correct anatomical locations of their head and that the electrodes have not moved outside of the prescribed threshold of the anatomical target during treatment. In some cases, the user interface of the electrode placing system can provide auditory or visual cues to the user, if the electrodes have moved from the required location. This can notify the user to move the electrodes to the prescribed location.

In some embodiments, at 214 process 200 can determine that the stimulation system is plugged into an outlet (or other transformer) and is receiving power. In this case, the electrode placing system (or other suitable computing device) can prevent the stimulation system from providing an electrical signal to the electrodes. This can, for example, prevent potential electrical shocks to the user.

In some embodiments, a practitioner (via the computing device), can analyze the past performance of the stimulation parameters, and the outcomes of the games, to augment the current treatment parameters. For example, if the user has completed the games with a sufficient accuracy, the practitioner can decrease the amplitude of the electrical signals, can decrease the overall treatment duration for the particular session, etc. In other embodiments, the electrode placing system (or other computing device) can determine (e.g., via mathematical calculations) the current treatment parameters, based on the data of the previous sessions (e.g., the game score, the properties of the electrical signals, such as amplitude).

Although the above description of the process 200 has primarily been described with a single anatomical location (e.g., the ear), in some embodiments, additional anatomical locations can be used for multiple reference points, which can increase the placement accuracy of the electrodes.

It should be understood that the above described steps of the process of FIG. 4, sub-process 206, and sub-process 210, can be executed or performed in any order or sequence not limited to the order and sequence shown and described in the figures, but as appropriate. Also, some of the above steps of the process of FIGS. 4, 5, and 7 can be executed or performed substantially simultaneously where appropriate.

Figure 10:
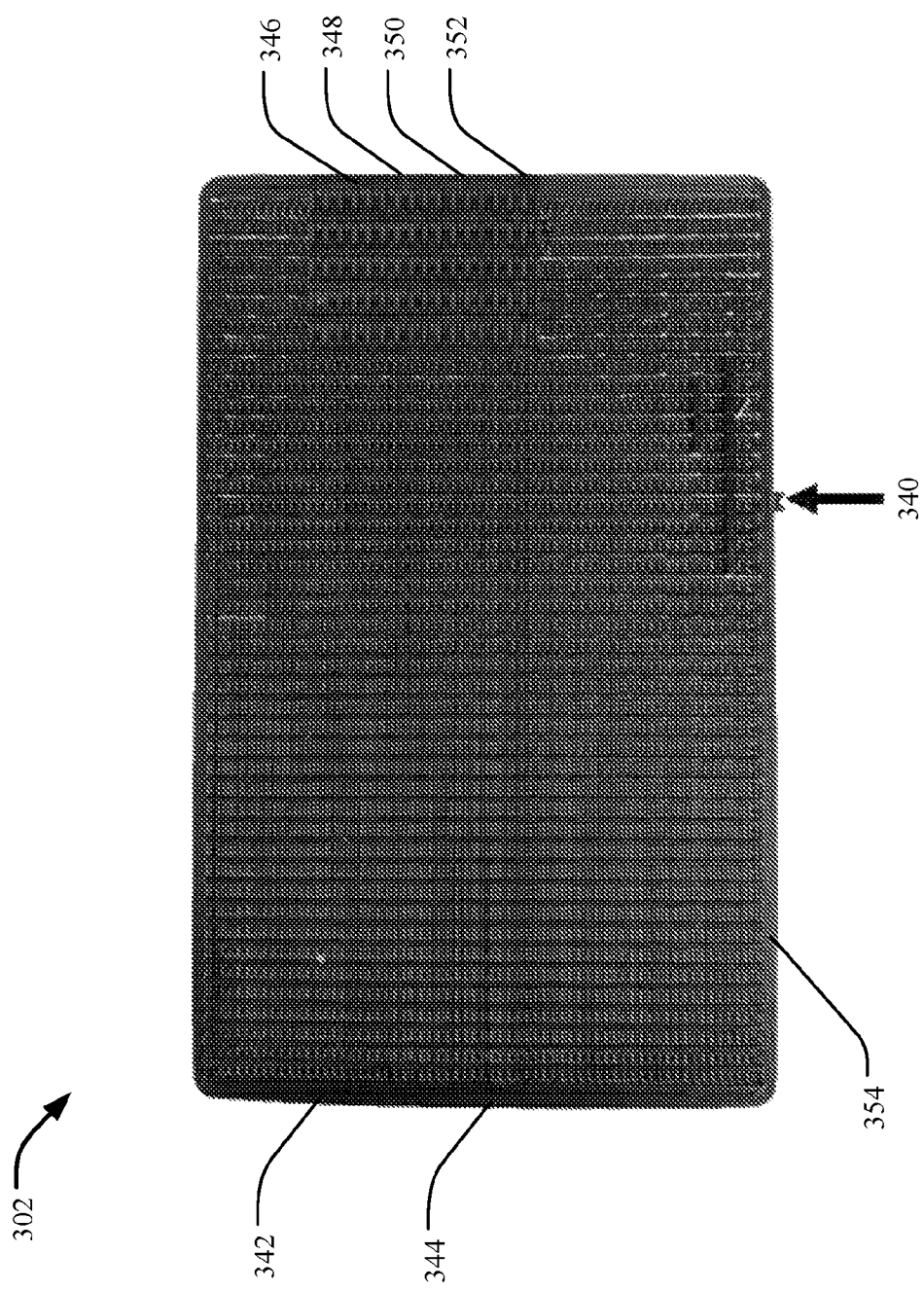
FIG. 10 shows a stimulation system within another neuromodulation system, which is a specific implementation of the neuromodulation system of FIG. 1.

FIGS. 10-13 show an example neuromodulation system 300, which is an implementation of the neuromodulation system 100. FIG. 10 specifically shows a stimulation system 302, which is an implementation of the stimulation system 102. The stimulation system 302 includes a power switch 340, an electrode port 342, a power port 344, a stimulation indicator 346, a power indicator 348, a Bluetooth indicator 350, a charging indicator 352, and a serial number 354. The power switch 340 allows a user to turn the stimulation system 302 on or off, upon actuation of the power switch 340. The electrode port 342 receives a cord, which is connected to the electrodes (discussed below), thereby allowing electrical communication between the stimulation system 302 and the electrodes. The power port 344 allows for charging of the stimulation system 302. The stimulation indicator 346 is a blue LED that is illuminated when the stimulation system 302 is providing an electrical signal to the electrodes. The power indicator 348 is a white LED that is illuminated when the stimulation system 302 has sufficient power. The Bluetooth indicator 350 is a green LED, which indicates by flashing if the stimulation system 302 is attempting to pair with another device, and which indicates by steady illumination that the stimulation system 302 is successfully in communication with another device. The charging indicator 352 is a red LED, which indicates by illumination that the stimulation system 302 is charging a power source (e.g., a battery), via the connection between a power source and the power port 344. When the charging indicator 352 is illuminated, the stimulation system 302 is prevented from supplying an electrical signal to the electrodes. The serial number 354 is an identifier that links a specific stimulation system 302. The serial number 354 could take on different forms in the art. For example, alternatively, the serial number 354 could be a 1D barcode, a 2D barcode, a radio-frequency identification ("RFID") chip, etc.

Figure 11:
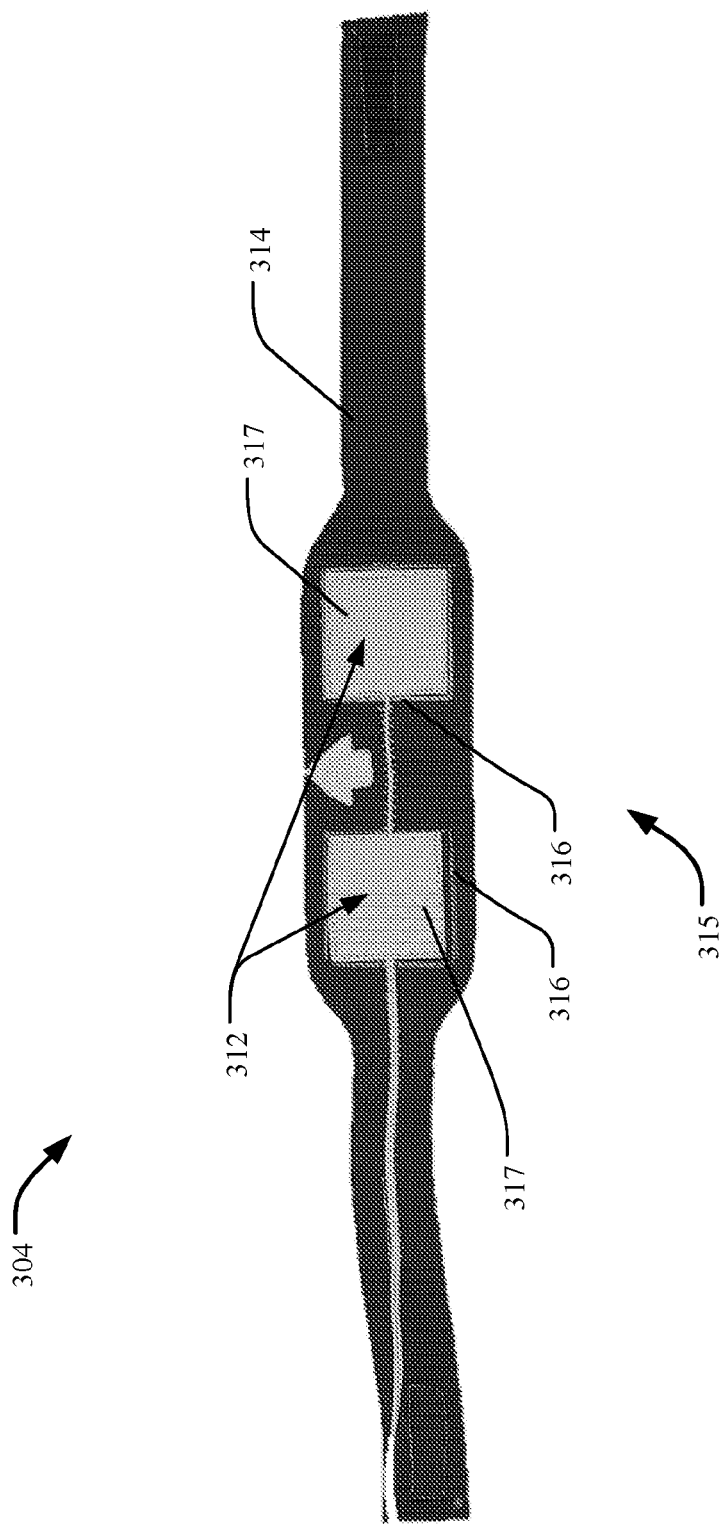
FIG. 11 shows a front view of an electrode system corresponding to the stimulation system of FIG. 10.
Figure 12:
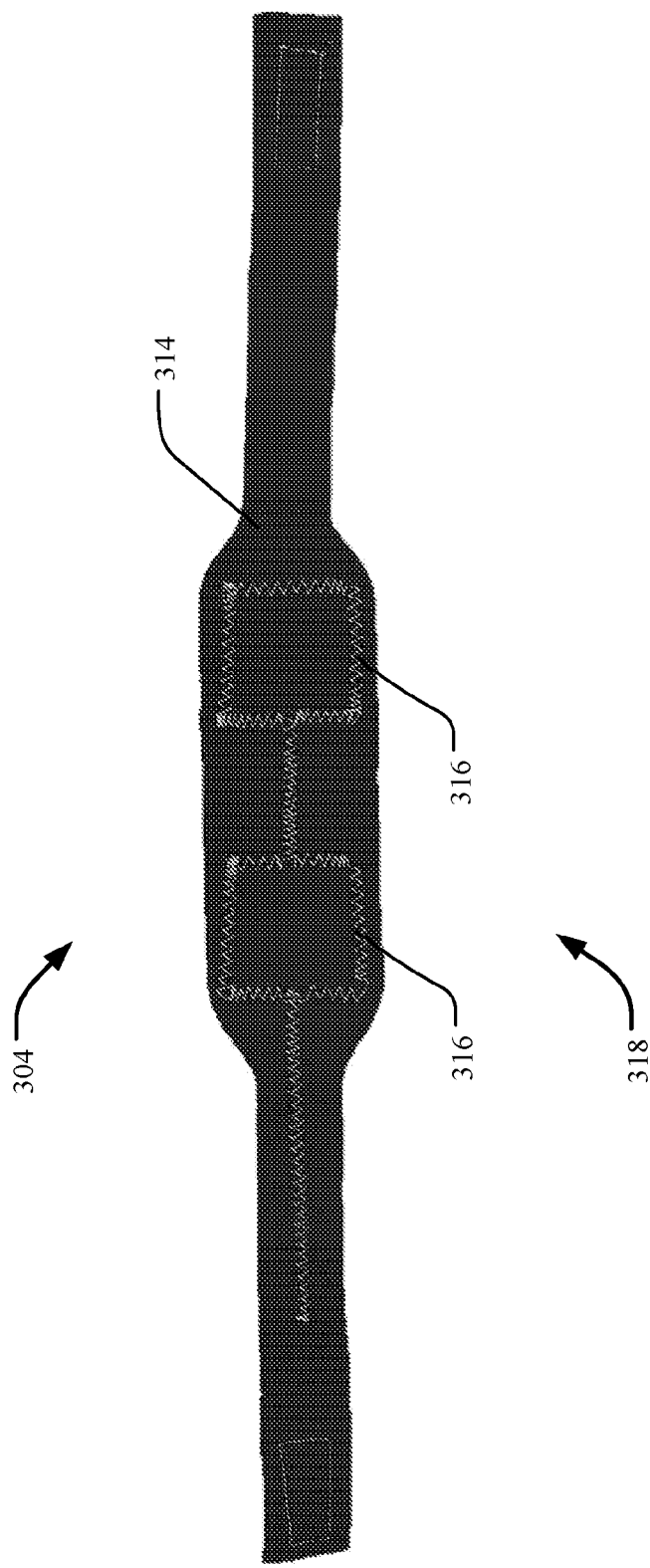
FIG. 12 shows a back view of the electrode system of FIG. 11.

FIGS. 11 and 12 show an electrode system 304, which is a specific implementation of the electrode system 104. The electrode system 304 includes a headpiece 314 having outwardly opposing ends that include Velcro on each surface. The Velcro® surface on each outwardly opposing end of the headpiece 314 are coupled together thereby securing the headpiece 314 to the user's head. In a central region of the headpiece 314 are two electrodes 312 which are coupled to the headpiece 314 via stitching 316. As shown in FIG. 6, a first surface 315 of the headpiece 314 includes an absorbent material 317 affixed to a surface of each of the electrodes 312 (e.g., the surface configured to contact the user's head). The first surface 315 of the headpiece 314 is configured to face the user's head, when the user secures the electrode system 304 to their head. The absorbent material 317, which is overlaid on each electrode 312 can be soaked with a saline solution to aid in electrical conduction of each electrode 312.

FIG. 12 illustrates the opposing second surface 318 of the headpiece 314, which is intended to face away from the user's head, when the electrode system 304 is secured to the user. The stitching 316 is easily visible on the second surface 318 of the headpiece 314, and the color of the stitching 316 contrasts the solid color of the second surface 318 of the headpiece. 314. In some embodiments, the stitching 316 can include a marking, shapes, or other easily distinguishable features (e.g., the "triangle" as shown in FIG. 8). This allows a computer vision algorithm to easily determine the location of the stitching 316, and thus the location of the electrodes, as the stitching 316 surrounds and secures each electrode 312 creating a constant spatial relationship between the stitching 316 and each electrode 312. The computer vision algorithm also determines anatomical features of the user, and the spatial relationship between the anatomical features and the stitching 316, and thus the spatial relationship between the anatomical features and the electrodes 312.

Figure 13:
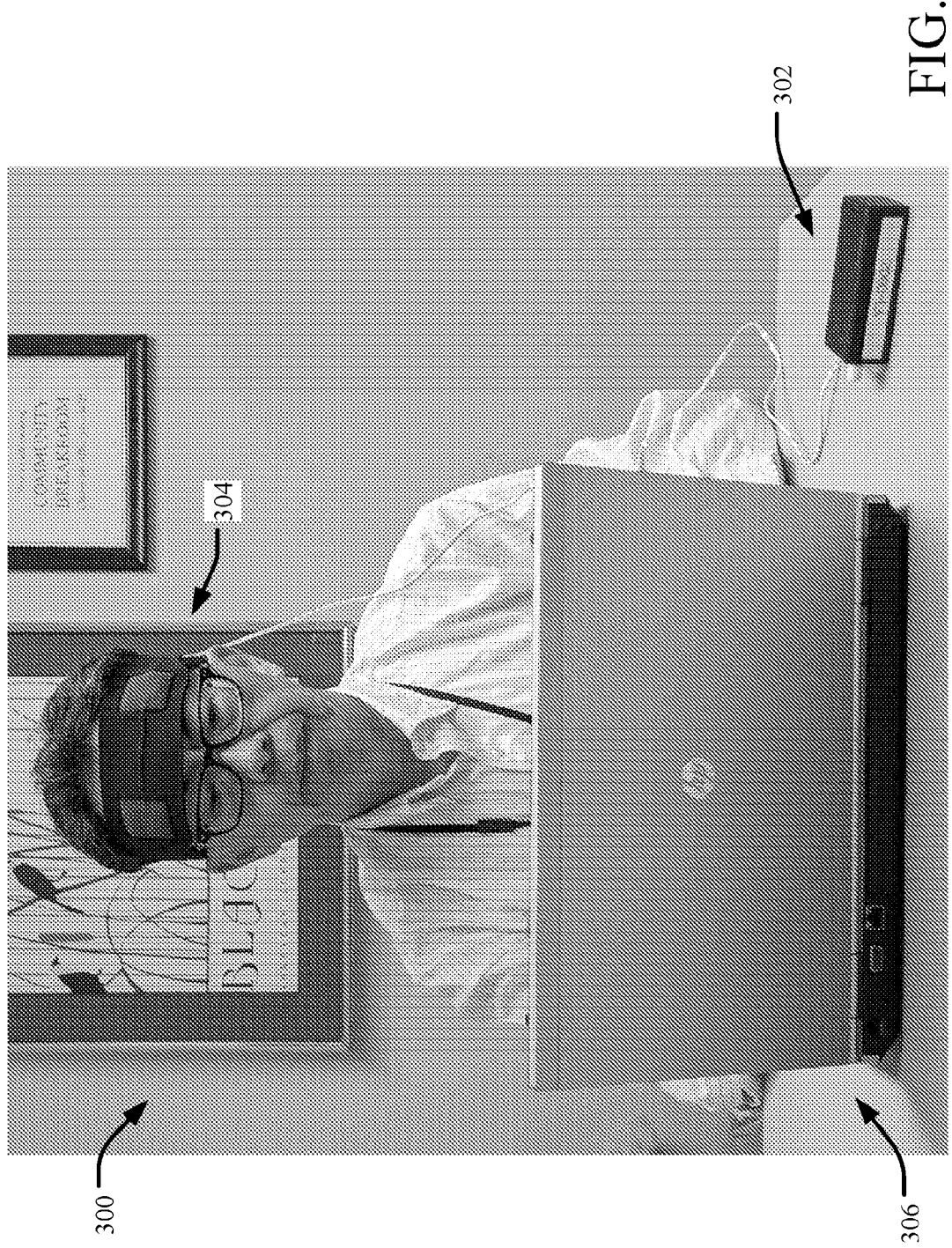
FIG. 13 shows a photograph demonstrating the generalized usage of the neuromodulation system being the specific implementation of the neuromodulation system of FIG. 1.

FIG. 13 shows the entire neuromodulation system 300. The neuromodulation system 300 includes the previously described stimulation system 302 and electrode system 304, and also includes an electrode placing system 306, which is a specific implementation of the electrode placing system 106. The electrode placing system 306 is shown as a personal computer, which can implement machine vision algorithms, according to various aspects of this disclosure. Additionally, the functionality described above, especially with regard to the process 200, also relates to the neuromodulation system 300.

The present disclosure has described one or more preferred embodiments, and it should be appreciated that many equivalents, alternatives, variations, and modifications, aside from those expressly stated, are possible and within the scope of the invention.

The invention claimed is:
1. A neuromodulation system comprising:
 a headpiece comprising:
  an interior sleeve formed between a first surface and a second surface opposite the first surface;

a plurality of electrodes coupled to the first surface of the headpiece, each of the plurality of electrodes having a known spatial relationship to each other;

at least one placement marker coupled to the second surface, the at least one placement marker having a known spatial relationship to each of the plurality of electrodes in order to facilitate correct positioning of the headpiece relative to an anatomical feature of a user;

an electrical signal generator in communication with the plurality of electrodes; and a controller device in communication with the electrical signal generator and configured to operate the electrical signal generator in order to generate an electrical stimulation using the plurality of electrodes;

wherein the plurality of electrodes is disposed within the interior sleeve and arranged between the first surface and the second surface.

2. The neuromodulation system of claim 1, further comprising a camera in communication with the controller device, and wherein the controller device is configured to:

operate the camera to acquire an image of the user wearing the headpiece, the image including an anatomical feature of the user and at least a portion of the at least one placement marker;

determine from the image, a spatial relationship between the anatomical feature and the at least one placement marker; and operate the electrical signal generator to generate the electrical stimulation using the plurality of electrodes based on the determined spatial relationship between the anatomical feature and the at least one placement marker indicating a correct positioning of the headpiece relative to the anatomical feature of the user.

3. The neuromodulation system of claim 2, wherein the controller device is configured to implement a computer vision algorithm to determine the spatial relationship between the anatomical feature and the at least one placement marker, wherein the computer vision algorithm:

receives as input the image;
identifies the anatomical feature in the image;
identifies the at least one placement marker in the image;
computes a spatial relationship between the anatomical feature and the at least one placement marker; and
generates as output the computed spatial relationship.

4. The neuromodulation system of claim 3, wherein the computer vision algorithm further identifies an identity of the user based on the image, and wherein the controller device operates the electrical signal generator only based on the identity of the user matching a stored identity for that user.

5. The neuromodulation system of claim 3, wherein the computer vision algorithm further identifies an identity of the user based on the image, and wherein the controller device selects control parameters for operating the electrical signal generator from a set of control parameters stored for the user based on the identity of the user matching a stored identity for that user.

6. The neuromodulation system of claim 1, wherein the at least one placement marker includes stitching that couples the plurality of electrodes to the first surface of the headpiece, the stitching having a color that is visually contrasted with a color of the second surface such that the at least one placement marker is visually distinct from the second surface of the headpiece.

7. The neuromodulation system of claim 1, wherein the at least one placement marker forms a pattern that indicates a proper orientation of the headpiece relative to the anatomical feature of the user.

* * * * *